(12) United States Patent
Marupaduga

(10) Patent No.: US 12,052,669 B2
(45) Date of Patent: *Jul. 30, 2024

(54) MINIMIZING UPLINK INTERFERENCE IN WIRELESS NETWORKS

(71) Applicant: T-Mobile Innovations LLC, Overland Park, KS (US)

(72) Inventor: Sreekar Marupaduga, Overland Park, KS (US)

(73) Assignee: T-Mobile Innovations LLC, Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 17/830,837

(22) Filed: Jun. 2, 2022

(65) Prior Publication Data

US 2022/0295416 A1 Sep. 15, 2022

Related U.S. Application Data

(63) Continuation of application No. 16/897,612, filed on Jun. 10, 2020, now Pat. No. 11,405,870.

(51) Int. Cl.
*H04W 52/14* (2009.01)
*H04B 7/0452* (2017.01)
*H04B 17/345* (2015.01)

(52) U.S. Cl.
CPC ........ *H04W 52/146* (2013.01); *H04B 7/0452* (2013.01); *H04B 17/345* (2015.01)

(58) Field of Classification Search
CPC ............. H04W 52/146; H04W 52/243; H04W 52/245; H04W 52/265; H04B 17/345; H04B 7/0452; H04B 7/15557
See application file for complete search history.

(56) References Cited

U.S. PATENT DOCUMENTS

| | | | |
|---|---|---|---|
| 7,965,785 B2 | 6/2011 | Li et al. | |
| 9,025,549 B2 | 5/2015 | Morinaga et al. | |
| 9,992,751 B1 | 6/2018 | Manchanda et al. | |
| 10,278,053 B1 | 4/2019 | Miller et al. | |
| 11,038,639 B1* | 6/2021 | Song | H04L 5/0069 |
| 2008/0165875 A1* | 7/2008 | Mundarath | H04B 7/086 |
| | | | 375/262 |
| 2017/0034717 A1* | 2/2017 | Yuan | H04W 24/04 |
| 2018/0092081 A1 | 3/2018 | Chen et al. | |
| 2019/0268852 A1 | 8/2019 | Ryu et al. | |
| 2020/0100178 A1* | 3/2020 | Kim | H04W 72/23 |
| 2021/0067220 A1* | 3/2021 | Abdelghaffar | H04W 52/0229 |

* cited by examiner

*Primary Examiner* — John J Lee
(74) *Attorney, Agent, or Firm* — Jones Robb, PLLC

(57) ABSTRACT

Selecting combinations of antennae of a wireless device based on transmission type includes determining a transmission type of a transmission between the wireless device and an access node and, based on the transmission type, instructing the wireless device to utilize different antenna configurations, including 5G EN-DC, MIMO, mm-wave, and other combinations. The different antenna configurations comprise different combinations of antennae of the wireless device.

15 Claims, 5 Drawing Sheets

MINIMIZING UPLINK INTERFERENCE IN WIRELESS NETWORKS

This patent application is a continuation of U.S. patent application Ser. No. 16/897,612, filed on Jun. 10, 2020, which is incorporated by reference in its entirety for all purposes.

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. As wireless technology continues to improve, various different iterations of radio access technologies (RATs) may be deployed within a single wireless network. Such heterogeneous wireless networks can include newer 5G and millimeter wave (mm-wave) networks, as well as older legacy networks (such as 3G). In some cases, deployment of 5G new radio (NR) access nodes alongside or co-located with 4G long-term evolution (LTE) access nodes utilizes dual connectivity technology (e.g. EN-DC), wherein control information is transmitted using the 4G RAT and data is transmitted using the 5G RAT. In other cases, a combination of transceivers and antennae may be used by access nodes and wireless devices to simultaneously communicate using both 4G and 5G RATs, using transmissions methods known as "concurrent mode", or "split mode" (wherein a single antenna element can be used for both 4G LTE and 5G NR transmissions).

Further, with the evolution of 5G, mm-wave, and sub-6G, increasing numbers of antennae can be used to form beams or perform multiple-in multiple-out (MIMO) operating modes, including single-user (SU-MIMO) and/or a multi-user (MU-MIMO) mode. In a recent evolution of MIMO technology, known as massive MIMO or large-scale MIMO, an access node may utilize hundreds of antennae to simultaneously transmit each of a plurality of different data streams to a corresponding plurality of wireless devices. Since MIMO utilizes orthogonal transmission layers to transmit multiple streams to wireless devices, massive MIMO is able to leverage the hundreds of antennae to transmit many streams across many orthogonal layers. Massive MIMO has been identified as one of the promising air interface technologies to address the massive capacity requirement required demanded by 5G networks. Further, as wireless device technology improves, increasing numbers of wireless devices are using higher transmit powers to transmit uplink data. For example, uplink MU-MIMO is a new service that applies MIMO technology to transmitting uplink data using a plurality of layers or streams.

However, there remain issues with using these advanced technologies in today's heterogenous wireless networks. One such issue relates to uplink interference caused at the multiple antennae of a serving access node, such as a base station, eNodeB, or gNodeB. For example, when increasing numbers of wireless devices are transmitting large amounts of data using uplink MIMO, there is more noise caused in the uplink channel. The noise may be caused by interference due to the different streams arriving at the antennae, and is particularly exacerbated when the uplink channel is loaded (which can be caused by too many wireless devices participating in uplink MU-MIMO). For example, when too many wireless devices are participating in uplink MU-MIMO, this leaves fewer resources (such as transmission layers) available for wireless devices that are not participating in uplink MU-MIMO (such as, for example, wireless devices participating in SU-MIMO). As a result of having fewer uplink resources (e.g. transmission layers), the wireless devices not participating in uplink MU-MIMO begin go transmit at higher uplink power levels. Alternatively or in addition, when uplink MU-MIMO group sizes are too large, fewer transmission layers may be available per wireless device, rendering even wireless devices participating in the uplink MU-MIMO groups to increase their transmission power. This can cause increased uplink interference, or "noise rise" that can further cause issues such as packet losses and increased retransmissions, potentially minimizing any gains expected by the increased spectral efficiency provided by MU-MIMO in the first place. Thus, there remains a need to minimize uplink interference at access nodes while maintaining performance provided by uplink MU-MIMO.

OVERVIEW

Exemplary embodiments described herein include methods, systems, and processing nodes for minimizing uplink interference at an access node in a wireless network. An exemplary method for minimizing uplink interference includes monitoring an uplink noise level at an access node; and responsive to determining changes in the uplink noise level, adjusting a maximum number of wireless devices eligible for uplink multi-user multiple-input multiple output (MU-MIMO).

An exemplary system for minimizing uplink interference includes a processing node and a processor coupled to the processing node. The processor is configured to perform operations including determining a rise in an uplink noise level of signals received at one or more of the plurality of antennae, and reducing a size of uplink multiple-input multiple output (MU-MIMO) groups served by the access node.

An exemplary processing node for minimizing uplink interference is configured to perform operations comprising monitoring an uplink noise level at an access node; and responsive to determining changes in the uplink noise level, adjusting a maximum number of wireless devices eligible for uplink multi-user multiple-input multiple output (MU-MIMO).

DETAILED DESCRIPTION

Figure 1:
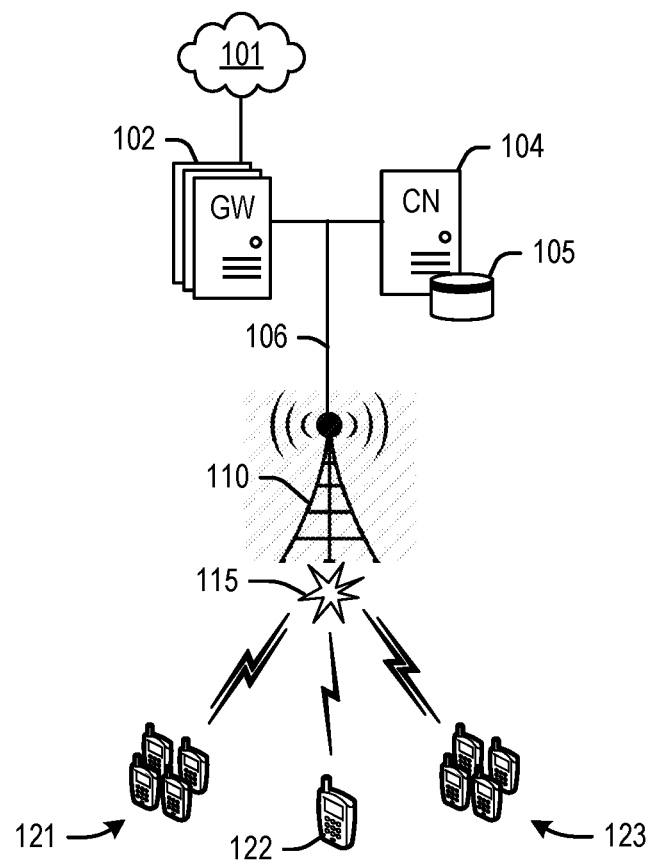
FIG. 1 depicts an exemplary system for minimizing uplink interference at an access node.

In embodiments disclosed herein, an interference level of an uplink channel (e.g. physical uplink shared channel) is used as a criteria to determine a number or quantity of wireless devices that can participate in uplink MU-MIMO. When the interference level is high, the quantity of wireless devices participating in uplink MU-MIMO can be reduced. Since excessive wireless devices participating in uplink MU-MIMO can cause increased noise in uplink channels at the access node, reducing the number of wireless devices participating in MU-MIMO can reduce the noise. As described herein, MIMO enables multiple streams of data to be transmitted using multiple orthogonal transmission layers. However, when there are too many wireless devices using uplink MU-MIMO resources (such as the aforementioned orthogonal transmission layers), these and other wireless devices may increase their transmit power levels, which increases the level of noise and/or interference. Thus, reducing the maximum number of wireless devices eligible to participate in or join uplink MU-MIMO groups can alleviate the noise level, since the additional orthogonal transmission layers can be assigned to the wireless devices thereby reducing the need for increased transmit power.

Therefore, a method described herein includes monitoring an uplink noise level at an access node, and responsive to determining changes in the uplink noise level, adjusting a maximum number of wireless devices eligible for uplink MU-MIMO. The adjusting can be performed for wireless devices within a sector deployed by the access node. For example, the sector is served by one or more antennae coupled to the access node. The one or more antennae can include any combination of: antennae associated with different radio access technologies (RATs) (including 3G, 4G, 5G, 5G sub 6G, 5G millimeter wave), antennae associated with different arrays (including 2×2, 4×2, 4×4, 8×8, 16×16, 32×32, 64×64, 128×128, and so on), and beamforming antennae. As described herein, the uplink noise level may be determined at the one or more antennae. The uplink noise level may rise to meet one or more thresholds, upon which the maximum number of wireless devices eligible for uplink MU-MIMO in the one or more sectors is limited. In an exemplary embodiment, limiting the maximum number of wireless devices eligible for uplink MU-MIMO includes reducing a size of MU-MIMO groups. Further as described herein, reducing the size of MU-MIMO groups can release orthogonal transmission layers, which may be assigned to the wireless devices attached to the access node. These wireless devices can include, for example, wireless devices that are in MU-MIMO groups (with the reduced size), or other wireless devices eligible for uplink single-user MIMO (SU-MIMO), since these wireless devices may benefit from using additional transmission layers. In response to being assigned the additional orthogonal transmission layers, these wireless devices can use less power for uplink transmissions. Alternatively or on addition, these wireless devices can be instructed to use additional layers and to use a smaller transmit power for uplink data. Moreover, if it is determined that the uplink interference falls below one or more thresholds, the maximum number of wireless devices eligible for uplink MU-MIMO may be increased or maintained.

As further described herein, processing nodes can be further configured to perform the aforementioned operations such as determining a rise in an uplink noise level of signals received at an access node, reducing a size of uplink MU-MIMO groups served by the access node and/or limiting a maximum number of wireless devices eligible for uplink MU-MIMO within one or more wireless sectors served by the access node, and assigning additional transmissions layers to wireless devices within the one or more wireless sectors. Such processing nodes and/or methods can be incorporated into a system comprising one or more network node and processors. These and additional operations are further described with respect to the embodiments depicted in FIGS. 1-7 below.

FIG. 1 depicts an exemplary system 100 for minimizing uplink interference in wireless networks. System 100 includes a communication network 101, gateway node(s) 102, controller node 104, access node 110, and wireless devices 121-123. Access node 110 can be any network node configured to provide communication between wireless devices 121-123 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, a next generation or gigabit NodeB device (gNBs) in 5G networks, or the like. In other embodiments, access node 110 can be a small access node including a microcell access node, a picocell access node, a femtocell access node, or the like such as a home NodeB or a home eNodeB device. By virtue of comprising a plurality of antennae as further described herein, access node 110 can deploy or implement different radio access technologies (RATs) such as 3G, 4G, 5G, sub-6G, mm-wave, as well as transmission modes including multiple-input-multiple-output (MIMO), single user MIMO (SU-MIMO), multi-user MIMO (MU-MIMO), etc. Moreover, each of wireless devices 121-123 can also be equipped with a plurality of antennae enabling these different types of transmissions. For example, each of wireless devices 121-123 may be capable of simultaneously communicating with access node 110 using combinations of antennae via 4G and 5G or any other RAT or transmission mode. For instance, a first MU-MIMO group 121 can be formed by wireless devices capable of transmitting uplink MU-MIMO data to access node 110 (and meeting other MU-MIMO criteria such as orthogonality, etc.), and a second MU-MIMO group 123 can be formed by wireless devices capable of transmitting uplink MU-MIMO data to access node 110 (and meeting a different orthogonality criteria). Wireless device 122 may not be eligible to participate in either group 121, 123, and may be communicating using SU-MIMO or any other transmission mode. Each wireless device 121-123 may further be capable of using uplink split mode. It is noted that while access node 110, MU-MIMO groups 121, 123, and wireless device 122 are illustrated in FIG. 1, any number of access nodes, MU-MIMO groups, and wireless devices can be implemented.

In operation, access node 110 (or any other entity within system 100) may be configured to execute a method including monitoring an uplink noise 115 at access node 110, and responsive to determining changes in the uplink noise 115, adjusting a maximum number of wireless devices eligible for uplink MU-MIMO. The adjusting can be performed for wireless devices within a sector deployed by the access node. For example, first MU-MIMO group 121 may be in one sector and second MU-MIMO group 123 may be in another sector, with wireless device 122 sharing a sector with either MU-MIMO group 121 or MU-MIMO group 123. Each sector may be served by one or more antennae coupled to the access node 110. A level of the uplink noise 115 may be monitored at the one or more antennae and, if it rises to meet one or more thresholds, the maximum number of wireless devices eligible for uplink MU-MIMO in the one or more sectors is limited. In an exemplary embodiment, limiting the maximum number of wireless devices eligible for uplink MU-MIMO includes reducing a size of MU- MIMO groups 121, 123. Further as described herein, reducing the size of MU-MIMO groups 121, 123 can release orthogonal transmission layers, which may be assigned to the wireless devices attached to the access node, including other wireless devices that are in MU-MIMO groups 121, 123, other wireless devices eligible for uplink SU-MIMO (e.g. wireless device 122), or any other wireless device attached to access node 110. In response to being assigned the additional orthogonal transmission layers, these wireless devices can use less power for uplink transmissions. Alternatively or on addition, these wireless devices can be instructed to use additional layers and to use a smaller transmit power for uplink data.

In an exemplary embodiment, upon determining that the uplink noise level rises to meet a first threshold, the maximum number of wireless devices eligible to join an uplink MU-MIMO group (or to participate in uplink MU-MIMO) is reduced by one half. Correspondingly, an amount of additional orthogonal layers released by the reduction may be assigned to each wireless device remaining in the MU-MIMO group (or to other wireless devices such as wireless device 122). For example, if the number of MU-MIMO eligible wireless devices per group is reduced from 8 to 4, each wireless device in a group is able to access twice as many orthogonal transmission layers, thereby using less power, with the increased redundancy making it less likely to cause issues such as packet drops, errors, retransmissions, and so on. Other combinations of reductions in group size and increases in orthogonal transmission layers per wireless device can be envisioned by those having ordinary skill in the art, in light of this disclosure.

Further in an exemplary embodiment, the noise 115 may be based on a noise rise. For example, the noise rise comprises a ratio of total received wideband power to the noise power, or can be based on a signal-to-interference noise ratio (SINR) of uplink signals received at access node 110. A higher noise rise value indicates that more wireless devices have attached to the network, and each wireless device has to transmit at a higher power to overcome the higher noise level. In an exemplary embodiment, any of the maximum size of the MU-MIMO groups, number of wireless devices eligible to participate in uplink MU-MIMO, and/or the number of extra orthogonal layers assigned to wireless devices, may be adjusted based on the noise rise meeting one or more thresholds. For example, when a noise rise reaches a threshold value of −100 dBm, the maximum group size may be set to 4 wireless devices, each of which is assigned 2 orthogonal transmission layers. When the noise rise rises to meet a second threshold value of −85 dBm, then a maximum group size may be set to 2 wireless devices, each of which is assigned 4 orthogonal transmission layers. Alternatively or on addition, where the noise rise meets a third threshold value of −80 dBm, then the maximum group size may be set to 2 wireless devices, each of which is assigned only 2 orthogonal transmission layers. As indicated above, these values are merely exemplary, and other combinations of noise rise threshold values, reductions in group size, and increases in orthogonal transmission layers per wireless device can be envisioned by those having ordinary skill in the art, in light of this disclosure.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106. Access node 110 may communicate with other access nodes (not shown) using a direct link such as an X2 link or similar.

Wireless devices 121-123 may be any device, system, combination of devices, or other such communication platform capable of communicating wirelessly with access node 110 using one or more frequency bands deployed therefrom. Each of wireless devices 121-123 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 121-123, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path—including combinations thereof. Communication link 106 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communications link 106 may include S1 communications links. Other wireless protocols can also be used. Communication link 106 can be a direct link or might include various equipment, intermediate components, systems, and networks. Communication link 106 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), a user plane function (UPF), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a session management function (SMF), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing correlations of transmission types with antenna configurations, and so on. This information may be requested by or shared with access node 110 via communication link 106, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, controller node 104, and/or network 101.

Figure 2:
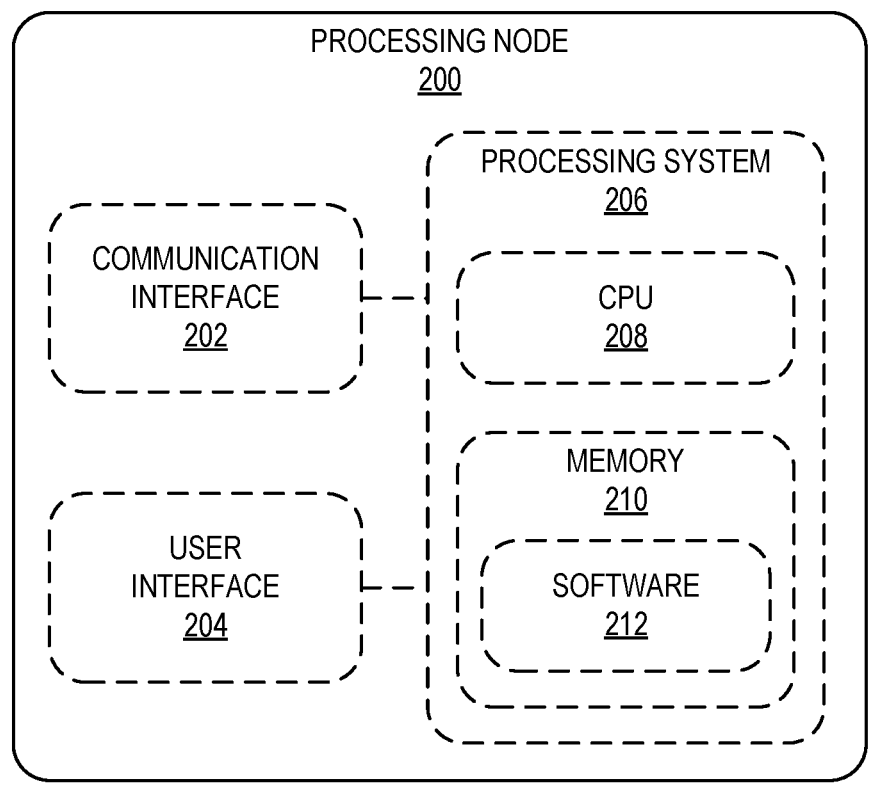
FIG. 2 depicts an exemplary processing node for minimizing uplink interference at an access node.

FIG. 2 depicts an exemplary processing node 200 for minimizing uplink interference in wireless networks. The processing node 200 includes a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 210 can include instructions for monitoring an uplink noise level at an access node, and responsive to determining changes in the uplink noise level, adjusting a maximum number of wireless devices eligible for uplink MU-MIMO. In another exemplary embodiment, software 210 can include instructions for determining a rise in an uplink noise level of signals received at one or more of the plurality of antennae, and reducing a size of uplink MU-MIMO groups served by the access node.

Figure 3:
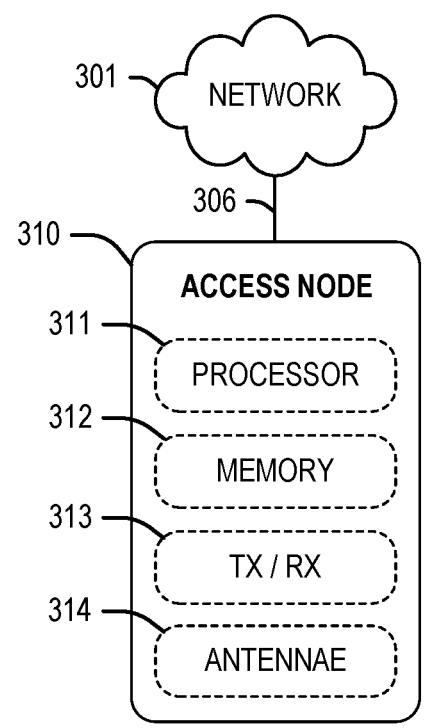
FIG. 3 depicts an exemplary access node for minimizing uplink interference.

FIG. 3 depicts an exemplary access node 310 for minimizing uplink interference in wireless networks. Access node 310 is configured as an access point for providing network services from network 301 to end-user wireless devices such as wireless devices 121-123 in FIG. 1. Access node 310 is illustrated as comprising a processor 311, a memory 312 for storing logical modules that perform operations described herein, and one or more transceivers 313 for transmitting and receiving signals via antennae 314. Combination of antennae 314 and transceivers 313 are configured to deploy a one or more radio air interfaces using different RATs, frequencies, and/or operating modes. Additional transceivers and antennae may be incorporated in order to deploy 4G, 5G, mm-wave, MU-MIMO or massive MU-MIMO data streams to wireless devices attached to access node 310, as well as to facilitate communication with other network nodes on network 301. Further, access node 310 is communicatively coupled to network 301 via communication interface 306, which may be any wired or wireless link as described above.

In an exemplary embodiment, memory 312 can include instructions for monitoring an uplink noise level at access node 310, and responsive to determining changes in the uplink noise level, adjusting a maximum number of wireless devices eligible for uplink MU-MIMO. The adjusting can be performed for wireless devices within a sector deployed by the access node 310. For example, the sector is served by one or more antennae 314 node. The one or more antennae 314 can include any combination of: antennae associated with different radio access technologies (RATs) (including 3G, 4G, 5G, 5G sub 6G, 5G millimeter wave), antennae associated with different arrays (including 2×2, 4×2, 4×4, 8×8, 16×16, 32×32, 64×64, 128×128, and so on), and beamforming antennae. As described herein, the uplink noise level may be determined at the one or more antennae 314. The uplink noise level may rise to meet one or more thresholds, upon which the maximum number of wireless devices eligible for uplink MU-MIMO in the one or more sectors is limited. In an exemplary embodiment, limiting the maximum number of wireless devices eligible for uplink MU-MIMO includes reducing a size of MU-MIMO groups. Further as described herein, reducing the size of MU-MIMO groups can release orthogonal transmission layers, which may be assigned to the wireless devices attached to the access node 310. These wireless devices can include, for example, wireless devices that are in MU-MIMO groups (with the reduced size), or other wireless devices eligible for uplink single-user MIMO (SU-MIMO), since these wireless devices may benefit from using additional transmission layers. In response to being assigned the additional orthogonal transmission layers, these wireless devices can use less power for uplink transmissions. Alternatively or on addition, these wireless devices can be instructed to use additional layers and to use a smaller transmit power for uplink data. Moreover, if it is determined that the uplink interference falls below one or more thresholds, the maximum number of wireless devices eligible for uplink MU-MIMO may be increased or maintained.

Figure 4:
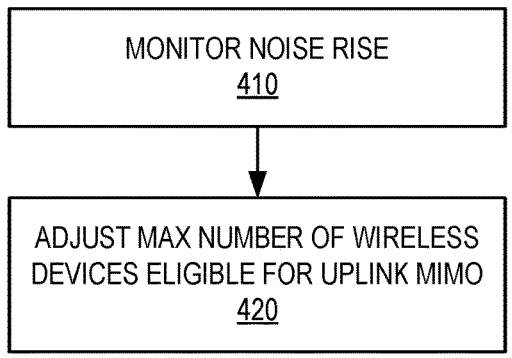
FIG. 4 depicts an exemplary method for minimizing uplink interference at an access node.

FIG. 4 depicts an exemplary method for minimizing uplink interference in wireless networks. The method of FIG. 4 is illustrated with respect to an access node, such as access node 110, 310. In other embodiments, the method can be implemented with any suitable network element, such as a processing node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, a noise rise is monitored at the access node. For example, the noise rise comprises a ratio of total received wideband power to the noise power, or can be based on a signal-to-interference noise ratio (SINR) of uplink signals received at the access node. A higher noise rise value indicates that more wireless devices have attached to the network, and each wireless device has to transmit at a higher power to overcome the higher noise level. Thus, at 420, any of the maximum size of the MU-MIMO groups, number of wireless devices eligible to participate in uplink MU-MIMO, and/or the number of extra orthogonal layers assigned to wireless devices, may be adjusted based on the noise rise meeting one or more thresholds. For example, when a noise rise reaches a threshold value of −100 dBm, the maximum group size may be set to 4 wireless devices, each of which is assigned 2 orthogonal transmission layers. When the noise rise rises to meet a second threshold value of −85 dBm, then a maximum group size may be set to 2 wireless devices, each of which is assigned 4 orthogonal transmission layers. Alternatively or on addition, where the noise rise meets a third threshold value of −80 dBm, then the maximum group size may be set to 2 wireless devices, each of which is assigned only 2 orthogonal transmission layers. As indicated above, these values are merely exemplary, and other combinations of noise rise threshold values, reductions in group size, and increases in orthogonal transmission layers per wireless device can be envisioned by those having ordinary skill in the art, in light of this disclosure.

Figure 5:
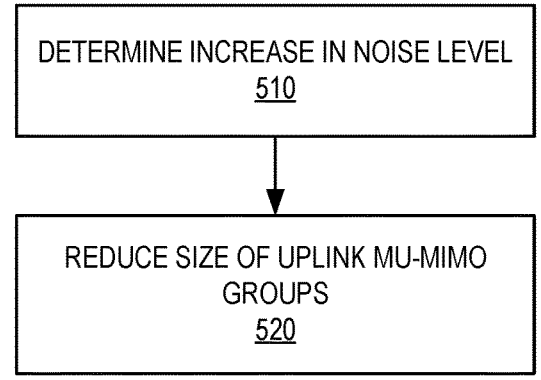
FIG. 5 depicts another exemplary method for minimizing uplink interference at an access node.

FIG. 5 depicts an exemplary method for minimizing uplink interference in wireless networks. The method of FIG. 5 is illustrated with respect to an access node, such as access node 110, 310. In other embodiments, the method can be implemented with any suitable network element, such as a processing node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, an increase in a noise level is determined at the access node and, at 520, a size of uplink MU-MIMO groups is reduced. For example, as described above, an interference level of an uplink channel (e.g. physical uplink shared channel) is used as a criteria to determine a number or quantity of wireless devices that can participate in uplink MU-MIMO. When the interference level is high, the quantity of wireless devices participating in uplink MU-MIMO can be reduced. Since excessive wireless devices participating in uplink MU-MIMO can cause increased noise in uplink channels at the access node, reducing the number of wireless devices participating in MU-MIMO can reduce the noise. As described herein, MIMO enables multiple streams of data to be transmitted using multiple orthogonal transmission layers. However, when there are too many wireless devices using uplink MU-MIMO resources (such as the aforementioned orthogonal transmission layers), these and other wireless devices may increase their transmit power levels, which increases the level of noise and/or interference. Thus, reducing the maximum number of wireless devices eligible to participate in or join uplink MU-MIMO groups can alleviate the noise level, since the additional orthogonal transmission layers can be assigned to the wireless devices thereby reducing the need for increased transmit power.

Figure 6:
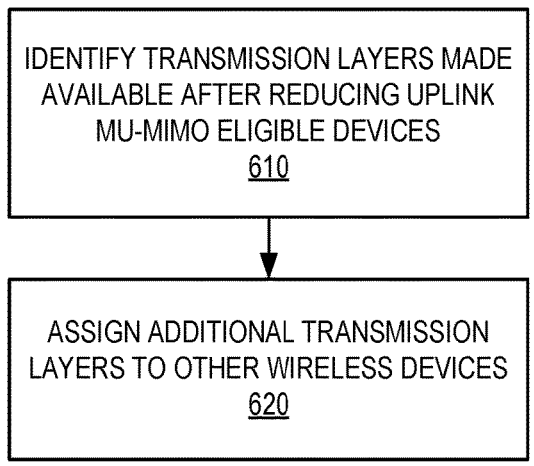
FIG. 6 depicts another exemplary method for minimizing uplink interference at an access node.

FIG. 6 depicts an exemplary method for minimizing uplink interference in wireless networks. The method of FIG. 6 is illustrated with respect to an access node, such as access node 110, 310. In other embodiments, the method can be implemented with any suitable network element, such as a processing node. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, transmission layers are identified as being available after a reduction in wireless devices eligible for uplink MU-MIMO. For example, as described above, the uplink noise level may rise to meet one or more thresholds, upon which the maximum number of wireless devices eligible for uplink MU-MIMO in the one or more sectors is limited. In an exemplary embodiment, limiting the maximum number of wireless devices eligible for uplink MU-MIMO includes reducing a size of MU-MIMO groups. Further as described herein, reducing the size of MU-MIMO groups can release orthogonal transmission layers. Thus at 620, these orthogonal transmission layers can be assigned to the wireless devices attached to the access node. These wireless devices can include, for example, wireless devices that are in MU-MIMO groups (with the reduced size), or other wireless devices eligible for uplink single-user MIMO (SU-MIMO), since these wireless devices may benefit from using additional transmission layers. In response to being assigned the additional orthogonal transmission layers, these wireless devices can use less power for uplink transmissions. Alternatively or on addition, these wireless devices can be instructed to use additional layers and to use a smaller transmit power for uplink data.

Figure 7A:
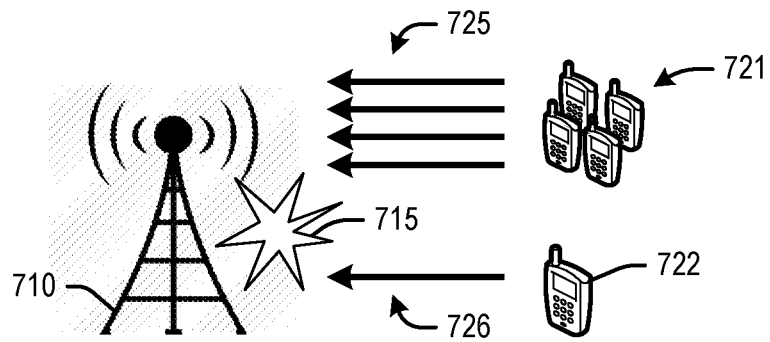
FIGS. 7A-7B depict an exemplary adjustment to a maximum number of wireless devices eligible for uplink MU-MIMO performed to minimize uplink interference at an access node.
Figure 7B:
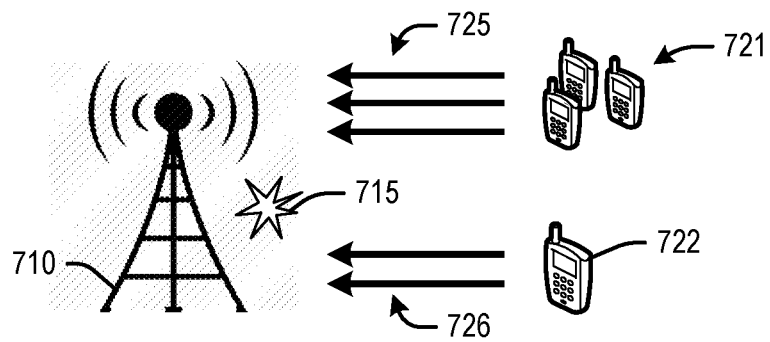

FIGS. 7A-7B depict an exemplary adjustment to a maximum number of wireless devices eligible for uplink MU-MIMO performed to minimize uplink interference at an access node. Access node 710 can be any network node configured to provide communication between MU-MIMO group 721 and wireless device 722, and a communication network (not shown). For instance, access node 710 may include any standard access node, such as a macrocell access node, base transceiver station, a radio base station, an eNodeB device, an enhanced eNodeB device, a next generation or gigabit NodeB device (gNBs) in 5G networks, or a small access node including a microcell access node, a picocell access node, a femtocell access node, or the like such as a home NodeB or a home eNodeB device. By virtue of comprising a plurality of antennae, access node 710 can deploy or implement different radio access technologies (RATs) such as 3G, 4G, 5G, sub-6G, mm-wave, as well as transmission modes including multiple-input-multiple-output (MIMO), single user MIMO (SU-MIMO), multi-user MIMO (MU-MIMO), etc. Moreover, each of wireless devices 721-722 can also be equipped with a plurality of antennae enabling these different types of transmissions. For instance, MU-MIMO group 721 comprises wireless devices capable of transmitting uplink MU-MIMO data to access node 710 (and meeting other MU-MIMO criteria, such as orthogonality, etc.). The uplink MU-MIMO provides a plurality of orthogonal transmission layers 725 via which MU-MIMO group 721 can transmit one or more uplink data streams, with additional redundancy and/or bandwidth provided by each layer. Whereas, wireless device 722 may not be eligible to participate in uplink MU-MIMO, and may be communicating using SU-MIMO or any other transmission mode via a single layer 726.

Further, with reference to FIG. 7A, access node 710 (or a processing node communicably coupled thereto) can be configured to monitor an uplink noise 715 at access node 710, and responsive to determining changes in the uplink noise 715, adjusting a maximum number of wireless devices eligible to participate in uplink MU-MIMO (or to join or form MU-MIMO group 721). In an exemplary embodiment, limiting the maximum number of wireless devices eligible for uplink MU-MIMO includes reducing a size of MU-MIMO group 721.

Thus with reference to FIG. 7B, MU-MIMO group 721 is illustrated with fewer wireless devices, and fewer transmission layers 725. For example, orthogonal transmission layers are released by reducing the size of MU-MIMO group 721, and these additional orthogonal transmission layers may be assigned to any wireless devices attached to the access node 710, including other wireless devices that are in MU-MIMO group 721, or other wireless devices eligible for uplink SU-MIMO (e.g. wireless device 722). Thus, in this example, wireless device 722 is illustrated as being assigned two orthogonal transmission layers 726. In response to being assigned the additional orthogonal transmission layers, wireless device 722 can use less power for uplink transmissions, thereby reducing a level of noise 715.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

The invention claimed is:

1. A method for minimizing uplink interference in wireless networks, the method comprising:
monitoring an uplink noise level at an access node; and
responsive to determining that the uplink noise level rises to meet one or more thresholds, reducing a size of MU-MIMO groups by limiting a maximum number of wireless devices eligible for uplink multi-user multiple-input multiple output (MU-MIMO).

2. The method of claim 1, further comprising assigning additional orthogonal transmission layers to wireless devices attached to the access node.

3. The method of claim 2, further comprising instructing the wireless devices to use less power for uplink transmissions.

4. The method of claim 1, further comprising:
determining that the uplink interference falls below one or more thresholds; and
increasing or maintaining the maximum number of wireless devices eligible for uplink MU-MIMO.

5. The method of claim 1, wherein the adjusting is performed for wireless devices within a sector deployed by the access node.

6. The method of claim 5, wherein the sector is served by one or more antennae comprising any combination of: antennae associated with different radio access technologies (RATs), antennae associated with different arrays, and beamforming antennae.

7. A system for minimizing uplink interference in wireless networks, the system comprising:
an access node comprising a plurality of antennae; and
a processor coupled to the access node, the processor being configured to perform operations comprising:
determining a rise in an uplink noise level of signals received at one or more of the plurality of antennae; and
reducing a size of uplink multiple-input multiple output (MU-MIMO) groups served by the access node by limiting a maximum number of wireless devices eligible for uplink MU-MIMO.

8. The system of claim 7, wherein the plurality of antennae is configured to deploy a radio air interface over one or more wireless sectors.

9. The system of claim 7, further comprising assigning additional orthogonal transmission layers to wireless devices within the one or more wireless sectors.

10. The system of claim 9, wherein the operations further comprise instructing the wireless devices to use less power for uplink transmissions.

11. The system of claim 7, wherein the plurality of antennae comprise any combination of: antennae associated with different radio access technologies (RATs), antennae associated with different arrays, and beamforming antennae.

12. A processing node for minimizing uplink interference in wireless networks, the processing node being configured to perform operations comprising:
monitoring an uplink noise level at an access node; and
responsive to determining that the uplink noise level rises to meet one or more thresholds, reducing a size of MU-MIMO groups by limiting a maximum number of wireless devices eligible for uplink multiple-input multiple output (MU-MIMO).

13. The processing node of claim 12, further comprising assigning additional orthogonal transmission layers to wireless devices attached to the access node.

14. The processing node of claim 13, wherein the instructions further comprise instructing the wireless devices to use less power for uplink transmissions.

15. The processing node of claim 12, further comprising determining that the uplink interference falls below one or more thresholds; and increasing or maintaining the maximum number of wireless devices eligible for uplink MU-MIMO.

* * * * *